Figure 1:
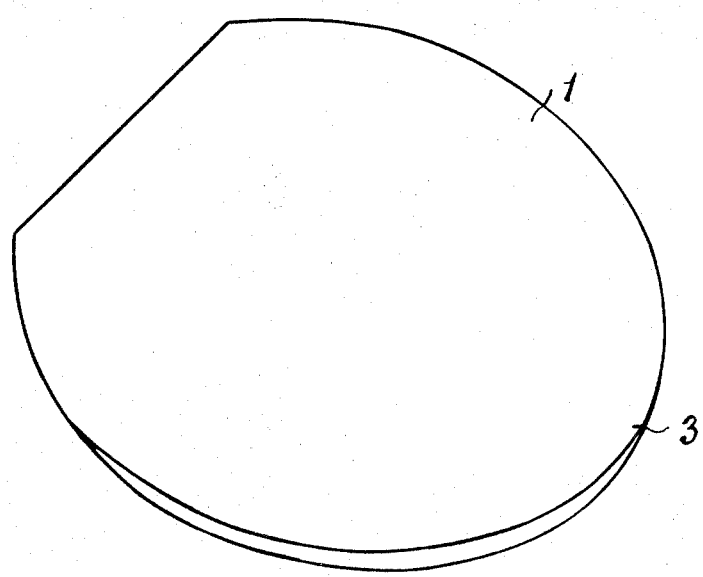

United States Patent [19]
Wallen

[11] 3,747,684
[45] July 24, 1973

[54] ELASTIC SOLE INSERT FOR HORSE SHOES

[76] Inventor: Bjorn Valter Wallen, Banmastarvagen 2, 163-58 Spanga, Sweden

[22] Filed: Jan. 4, 1971

[21] Appl. No.: 103,688

[52] U.S. Cl. .................. 168/28, 168/4, 168/26
[51] Int. Cl. .................. A01l 7/02, A01l 5/00
[58] Field of Search .................. 168/4, 12, 13, 14, 168/26, 28

[56] References Cited
UNITED STATES PATENTS

| | | | |
|---|---|---|---|
| 516,494 | 3/1894 | La Veck | 168/26 |
| 916,750 | 3/1909 | Mills | 168/26 |
| 3,490,536 | 1/1970 | Hourlier | 168/4 |
| 219,944 | 9/1879 | Hoffmann | 168/DIG. 1 |
| 562,302 | 6/1896 | Juillard | 168/14 |
| 1,036,592 | 8/1912 | Erb | 168/26 |
| 1,212,266 | 1/1917 | Schrader et al. | 168/DIG. 1 |

*Primary Examiner*—Aldrich F. Medbery
*Attorney*—Munson & Fiddler

[57] ABSTRACT

An elastic sole insert intended for placement between the hoof of a horse and the horse's shoe comprising an insert shaped to conform to the shape of the shoe and composed of relatively resilient material having wear-resistant characteristics, an example of such a material being a plastic having a hardness of about 77–87 Shore A and a modulus of elasticity of about 100–2,000 Kp.cm$^2$, said insert being either imperforate or else provided with at least one venting aperture.

1 Claim, 2 Drawing Figures

PATENTED JUL 24 1973 3,747,684

INVENTOR.
BJORN VALTER MALLEN
BY
HUDSON & FIDDLER
ATTORNEY

# ELASTIC SOLE INSERT FOR HORSE SHOES

The present invention relates to an elastic sole or insert composed of a plastic material and intended to be used in conjunction with conventional horse shoes that are composed of steel, light metal or plastic and as used on horses of the racehorse type. Said insertion is located between the hoof of the horse and the usual horse shoe.

By the application of an insert composed of plastic material between the animal's hoof and the shoe one reduces, because of the relatively large contacting surface and the elasticity of the insert, the contact pressure of the hoof against the shoe in relation to the shoe against the ground, which results in increasing the efficiency of the racehorse, as the joints, the hooves and the ligaments of the animal are resultantly substantially less strained. On the other hand, one still obtains the good grip of the shoe composed of steel, light metal or plastic against the ground in all sorts of weather.

It has been proposed to employ soles composed of leather, felt, rubber or the like but such devices have had little success because of the non-rigidity and poor wearing resistance of such soles.

The present invention is characterized in that the sole or insert consists of a plastic material having a hardness of 77-87 Shore A and a modulus of elasticity of about 100-2,000 Kp/cm$^2$ and is applied to the entire hoof of the horse. suitable embodiments of the sole or insert can be either a sole of uniform thickness or a wedge-shaped sole having its thinner portion, indicated at 3 in the drawings, located at the front part of the hoof. The elastic sole can also be provided with a recess or vent for airing the frog of the hoof.

Figure 2:
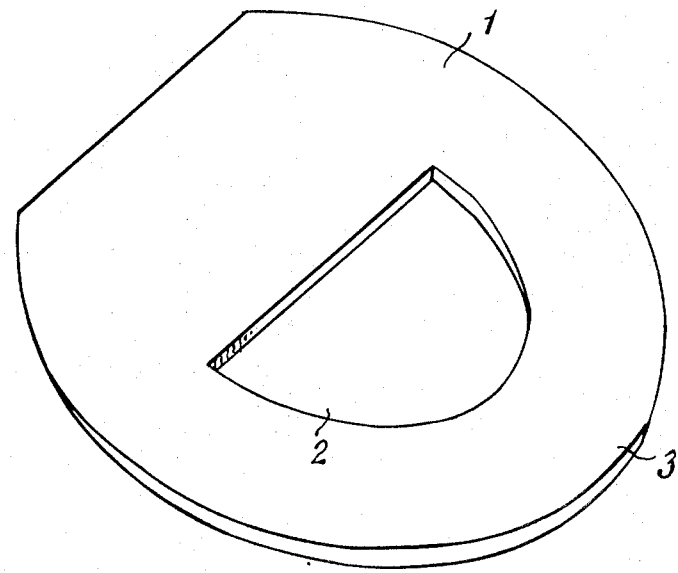

In the accompanying drawings, wherein embodiments of the invention are disclosed, FIG. 1 shows the entire elastic sole and FIG. 2 shows the sole provided with a central recess or vent for the airing of the frog of the hoof.

The elastic sole 1 can, for example, be made of a plastic material in the form of a copolymer of polyurethane and whose modulus of elasticity is in the range of 100-3,000 Kp/cm$^2$. This plastic material can be worked by means of compression molding, injection molding or the like. The hardness of the material can be varied as needed, but a hardness of about 85 Shore A has proved very satisfactory. A hardness of the material of 90-110 Shore A has, on the other hand, proved to be too hard for the requirements of the sole.

The production of the elastic sole according to the invention, may be suitably done by means of compression molding or injection molding with a material comoosed of polyurethane, at about 190° C. To produce an optimum polymerization of the plastic material it should undergo a finishing treatment which is suitably made in furnaces of conventional type at about 110° C. for about 5-10 hours. Without heat treatment one can produce total polymerization so that the finished product is stored at room temperature for about five weeks, and maximum strength is attained after 4 months. It is very important that the heat treatment of the storage be completed as the material does not otherwise attain the better properties as mentioned above.

The elastic sole or insert according to the invention has good wear strength and good elasticity, and therefore it is greatly resistant to deformation. The large contact surface of thesole in conjunction with its elasticity; the high shock-absorbing capacity and the resistance of such a sole makes the efficiency of the horse better and it can be used earlier/than has previously been possible.

As herein stated, the sole or insert is maintained between the surface of the hoof and the shoe and may be maintained in position by the fastening elements which attach the shoe to the hoof.

What is claimed is:

1. An elastic sole insert for placement between the hoof of a horse and a shoe worn by the horse, said insert consisting essentially of a unitary layer of a plastic material comprising a copolymer of polyurethane and having a hardness of 77-87 Shore A and a modulus of elasticity of 100 to about 2,000 Kg/cm$^2$, and being adapted to be applied to the entire downwardly facing surface of the hoof of the horse, said insert being wedge-shaped in cross-section, the thinner portion of said insert being adapted to be located at the front part of the hoof of the horse, and said insert being provided with a recess or vent disposed therein for airing the frog of the hoof.

* * * * *